United States Patent [19]

Fachini

[11] Patent Number: 5,032,640

[45] Date of Patent: * Jul. 16, 1991

[54] COMPOSITION FOR GIVING BITUMINOUS CONGLOMERATES HIGH MECHANICAL CHARACTERISTICS AND RESISTANCE TO HIGH AND LOW TEMPERATURES, ALSO BY USING SLUDGE OBTAINING FROM THE TREATMENT OF WASTE LUBRICATING OIL

[76] Inventor: Marco Fachini, Via Paisiello 28, U029131 Milano, Italy

[ * ] Notice: The portion of the term of this patent subsequent to May 23, 2006 has been disclaimed.

[21] Appl. No.: 370,500

[22] Filed: Jun. 23, 1989

Related U.S. Application Data

[63] Continuation-in-part of Ser. No. 213,052, Jun. 29, 1988, abandoned.

[51] Int. Cl.$^5$ .................... C08L 23/04; C08L 25/10; C08K 3/26; C08F 253/00
[52] U.S. Cl. .................... 524/426; 524/401; 524/518; 524/527; 524/88; 524/240; 524/247

[58] Field of Search ............... 524/401, 426, 518, 527; 525/88, 240, 247

[56] References Cited

U.S. PATENT DOCUMENTS

| | | | |
|---|---|---|---|
| 3,890,263 | 6/1975 | Meynard | 524/68 |
| 4,069,181 | 1/1978 | Healy et al. | 524/70 |
| 4,362,828 | 12/1982 | Agarwal et al. | 524/66 |
| 4,460,723 | 7/1984 | Rollmann | 524/70 |
| 4,617,227 | 10/1986 | Weaver | 428/220 |
| 4,722,953 | 2/1988 | Derviter et al. | 524/44 |
| 4,738,997 | 4/1988 | Lundberg et al. | 524/68 |
| 4,745,155 | 5/1988 | Grossi | 525/54.5 |
| 4,778,852 | 10/1988 | Futamara | 525/97 |

Primary Examiner—Thurman Page
Assistant Examiner—Carlos Azpuru
Attorney, Agent, or Firm—David H. Semmes

[57] ABSTRACT

The description is given of a composition, which can be added to the bituminous binder during the preparation of the bituminous conglomerate used for paving roads, for giving the conglomerate high mechanical characteristics and resistance to high and low temperatures.

12 Claims, No Drawings

COMPOSITION FOR GIVING BITUMINOUS CONGLOMERATES HIGH MECHANICAL CHARACTERISTICS AND RESISTANCE TO HIGH AND LOW TEMPERATURES, ALSO BY USING SLUDGE OBTAINING FROM THE TREATMENT OF WASTE LUBRICATING OIL

This is a continuation-in-part of copending application Ser. No. 07/213,052 filed on June 29, 1988, which is now abandoned.

The bituminous conglomerates usually used for topping roads in locations where very high or very low temperatures can occur do not have the strength characteristics to stand up under these extreme temperatures, with the result that the repeated softening, due to the high temperatures, and/or disassociation of the pavement material, due to the low temperatures, reduce the service life of the road topping.

This fact not only has grave consequences from the economic point of view, but also seriously impedes the smooth and safe flow of traffic on these roads.

This present invention concerns a composition which, when added to the aforementioned conglomerates in the right proportion, considerably increases their mechanical characteristics and resistance to low and high temperatures. This invented composition also permits the use of sludges obtained from the treatment with solvents of waste lubricating oils; furthermore, this can also be done at ambient temperature, as described later.

The composition which is the object of this invention consists of the following components:

| | |
|---|---|
| copolymer terpolymer - ethylene propylene (EPDM) (elastomer) | 30-48% |
| isotactic polypropylene | 16-32% |
| calcium carbonate | 30-50% |

These indicated proportions are given by way of example, and show the limiting values of the optimum proportions.

The SBR styrene-butadiene composition can be used, in the same proportions, in place of the EPDM copolymer terpolymer.

Furthermore, up to 50% of the contained isotactic polypropylene (that is, up to a proportion of 8-16%) can be replaced by powdered polythene, without substantially affecting the performance of the above described composition.

The said components are mixed and pulverized in a standard hammer-type mill. When the hot bituminous conglomerate is being prepared (at 180° C.), the mixed and pulverized components are added to the conglomerate in the proportion of 20-25% with respect to the bituminous binder. Therefore, if the amount of binder used is the usual 6%, with respect to the inert components and fillers, the proportional amount of the above described composition in the final conglomerate mix will be of 1,2 to 1,5%.

The above-described composition (additive) gives the bituminous conglomerate the kind of physical and mechanical characteristics which make it particularly useful for paving roads in such special localities where very high or very low temperatures can occur.

It has been experimentally demonstrated that a bituminous conglomerate containing the aforesaid additive has the following characteristics:

resistance to temperatures exceeding 100° C.;
resistance to temperatures as low as −20° C.;
average Marshall stability of about 900.

As mentioned previously, the above described composition can also be used with sludges obtained by treating with solvents waste lubricating oils, for the ambient-temperature preparation of bituminous conglomerates, as well as waterproofing and sealing products. This constitutes an alternative to the procedures described in Applicant's copending European patent application S. N. 86 10 75 31.5 of June 5, 1986, corresponding to and claiming priority form italian patent application no. 21053 A/85 of June 6, 1985.

For the ambient-temperature preparation (not heated), the optimum proportions of the components are in the following ranges:

| | |
|---|---|
| sludge (obtained as described above) | 15-30% |
| EPDM copolymer terpolymer - ethylene propylene | 12-28% |
| isotactic polypropylene | 16-30% |
| calcium carbonate | 18-40% |

Also in this case, the SBR styrene-butadiene compound can be used in place of the copolymer terpolymer, and as much as half of the isotactic polypropylene can be replaced by powdered polythene.

Ashes from thermoelectric plants—which consist of small hollow spheres—that have a good drying capability, can advantageously be added to this compound in a proportion of 10 to 20%.

The components of said compound are put in a vessel provided with a blade-type agitator, or in a standard mixer.

The obtained product is in the form of granules (chips) which are 3-5 mm in diameter.

This product can be used in this form or can be milled, in a blade-type mill; this treatment must only be done for a very short time to avoid harmful heating of the product. The resulting product is added to the hot bituminous conglomerate (180° C.) being prepared, in an analogous way as is the previously-mentioned sludge-free product, in the proportion of 20-25% with respect to the bituminous binder, thereby obtaining a proportional amount of 1.2-1.5% with respect to the bituminous conglomerate including the inert materials and fillers.

The obvious advantages of the preparation at ambient temperature are the savings in time and energy, which translate into a savings in cost. Furthermore, less complicated equipment is required which, because of the said brief milling treatment, nevertheless permits the obtaining of a product which is sufficiently homogeneous.

The composition described at the beginning of this description can obviously be used for obtaining a hot compound, using sludges obtained by the treatment with solvents of waste lubricating oils, and changing the optimum proportions to the following values:

| | |
|---|---|
| sludges as previously described | 40-60% |
| copolymer terpolymer - ethylene propylene EPDM | 12-30% |
| isotactic polypropylene | 12-30% |
| calcium carbonate | 4-10% |

Also in this case, the SBS styrene-butadiene composition can be used in place of the EPDM copolymer terpolymer, and up to as much as half of the isotactic polypropylene can be substituted with powdered polythene.

The aforesaid components are processed in a mixer with a diathermal-oil sheath at 180°-190° C. After the components have been thoroughly mixed together, the pieces are unloaded, appropriately cooled, and put into a blade-type mill to be pulverized. The pulverizing can be done more thoroughly in the hot process than in the one carried out at ambient temperature.

The final product is added to the mix used for the road-topping operations in the proportions of 20-25% with respect to the bituminous binder, and can also be used for waterproofing and sealing operations.

It was verified that a softening point for both the cold- and hot-produced compound varied between 180° and 185° C.

The bituminous conglomerate obtained with the above described processes have also given very good results in the mechanical tests performed. These results are as follows:

| penetration index | +5 |
|---|---|
| Marshall stability | 1200 kg (approx.) |
| Marshall creep | 3,85 mm (approx.) |
| Marshall stiffness | 130 (approx.) |

I claim:

1. A process for utilizing sludges derived from the treatment of waste lubricating oils with solvents, whereby bituminous conglomerates for road paving, waterproofing and sealing are obtained, characterized by the fact that said sludges are mixed at ambient temperature with EPDM copolymer terpolymer- ethylene propylene isotactic polypropylene, calcium carbonate in the following range of proportions:

| sludge | 15-30% |
|---|---|
| EPDM copolymer terpolymer - ethylene propylene | 12-28% |
| isotactic polypropylene | 16-30% |
| calcium carbonate | 18-40%. |

2. A process as in claim 1, in which the EPDM copolymer terpolymer-ethylene propylene is replaced by SBS styrene-butadiene, in the same range of proportions.

3. A process as in claim 1, in which up to as much as half of the isotactic polypropylene is substituted with powdered polythene.

4. A process as in claim 2, in which up to as much as half of the isotactic polypropylene is substituted with powdered polythene.

5. A process as in claim 1, in which ashes obtained from thermoelectric plants are added to the mixture in a range of proportions of 10-20%.

6. A process as in claim 2, in which ashes obtained from thermoelectric plants are added to the mixture in a range of proportions of 10-20%.

7. A process as in claim 3, in which ashes obtained from thermoelectric plants are added to the mixture in a range of proportions of 10-20%.

8. A process as in claim 4, in which ashes obtained from thermoelectric plants are added to the mixture in a range of proportions of 10-20%.

9. A process as in claim 1, characterized by the fact that it is carried out in the hot state rather than in the cold state, and that the range, of proportions of the components is modified as follows:

| sludge | 40-60% |
|---|---|
| EPDM copolymer terpolymer-ethylene propylene | 12-30% |
| isotactic polypropylene | 12-30% |
| calcium carbonate | 4-10%. |

10. A process as in claim 9, in which the EPDM copolymer terpolymer-ethylene propylene is replaced by SBR styrene butadiene, in the same range of proportions.

11. A process as in claim 9, in which up to as much as half of the isotactic polypropylene is substituted with powdered polythene.

12. A process as in claim 10, in which up to as much as half of the isotactic polypropylene is substituted with powdered polythene.

* * * * *